(12) United States Patent
Erichsen et al.

(10) Patent No.: US 9,835,141 B2
(45) Date of Patent: Dec. 5, 2017

(54) WIND TURBINE BLADE AND A LIGHTNING MEASUREMENT SYSTEM THEREIN

(75) Inventors: Hans V. Erichsen, Århus V (DK);
Niels Birch Mogensen, Viborg (DK);
Anders Niels Hansen, Langå (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 1352 days.

(21) Appl. No.: 13/560,508

(22) Filed: Jul. 27, 2012

(65) Prior Publication Data
US 2013/0028739 A1 Jan. 31, 2013

Related U.S. Application Data

(60) Provisional application No. 61/512,439, filed on Jul. 28, 2011.

(30) Foreign Application Priority Data

Jul. 28, 2011 (DK) .................................. 2011 70416

(51) Int. Cl.
*F03D 80/30* (2016.01)

(52) U.S. Cl.
CPC .............. *F03D 80/30* (2016.05); *Y02E 10/72* (2013.01)

(58) Field of Classification Search
CPC ............. F03D 11/0033; F03D 11/0044; F03D 11/0091; F03D 17/00; F03D 80/00; F03D 80/30; F05B 2260/80; F05B 2270/80; G01R 19/0092; G01R 29/0842
USPC ...................... 324/72; 340/310.07; 416/146 R
See application file for complete search history.

(56) References Cited

U.S. PATENT DOCUMENTS

| | | | | |
|---|---|---|---|---|
| 5,831,426 A | * | 11/1998 | Black, Jr. ............... | G01R 33/09 324/117 R |
| 6,038,118 A | * | 3/2000 | Guerra ..................... | H02H 3/22 307/66 |
| 6,140,810 A | * | 10/2000 | Bohnert ............... | G01R 15/241 324/72 |
| 6,741,069 B1 | * | 5/2004 | Klemar ................... | F03D 11/00 324/72 |
| 7,511,467 B2 | * | 3/2009 | Jantunen ............ | G01R 29/0842 324/72 |

(Continued)

FOREIGN PATENT DOCUMENTS

| | | |
|---|---|---|
| EP | 1230556 A1 | 8/2002 |
| EP | 1754887 A1 | 2/2007 |

(Continued)

OTHER PUBLICATIONS

Danish Patent and Trademark Office, Search Report in corresponding DK Application No. PA 2011 70416 dated Mar. 16, 2012, 8 pages.

(Continued)

*Primary Examiner* — Sean J Younger
(74) *Attorney, Agent, or Firm* — Patterson + Sheridan, LLP (57) ABSTRACT

The invention generally relates to a blade for a wind turbine, and to a blade for a wind turbine comprising a lightning measurement system. In particular, a lightning measurement system is provided, comprising a lightning current sensor located in the blade for more accurate lightning measurements. A method of measuring a lightning strike is also provided.

15 Claims, 6 Drawing Sheets

(56) References Cited

U.S. PATENT DOCUMENTS

| | | | | |
|---|---|---|---|---|
| 7,633,283 | B2* | 12/2009 | Georgeson | B64D 45/02 |
| | | | | 324/173 |
| 7,714,735 | B2* | 5/2010 | Rockwell | G01R 19/2513 |
| | | | | 324/126 |
| 2007/0009361 | A1* | 1/2007 | Moller Larsen | F03D 11/00 |
| | | | | 416/146 R |
| 2010/0285849 | A1* | 11/2010 | Porjo | G01W 1/16 |
| | | | | 455/574 |
| 2010/0328084 | A1* | 12/2010 | Kraemer | G01R 29/0842 |
| | | | | 340/601 |
| 2011/0118982 | A1* | 5/2011 | Koste | F03D 7/00 |
| | | | | 702/4 |
| 2011/0267027 | A1* | 11/2011 | Iannotti | F03D 11/0033 |
| | | | | 324/72 |

FOREIGN PATENT DOCUMENTS

| | | | |
|---|---|---|---|
| EP | 2525460 | A1 | 11/2012 |
| JP | 2002082138 | A * | 3/2002 |
| WO | 0133234 | A1 | 5/2001 |
| WO | 2004044419 | A1 | 5/2004 |
| WO | 2009083006 | A1 | 7/2009 |

OTHER PUBLICATIONS

European Patent Office, European Application No. 12005534.8, Extended European Search Report dated May 20, 2015, 7 pages.

* cited by examiner

WIND TURBINE BLADE AND A LIGHTNING MEASUREMENT SYSTEM THEREIN

CROSS-REFERENCE TO RELATED APPLICATIONS

This application claims priority under 35 U.S.C. §119(a) to Danish Patent Application No. PA 201170416, filed Jul. 28, 2011. This application also claims the benefit of U.S. Provisional Application No. 61/512,439, filed Jul. 28, 2011. Each of the applications is incorporated by reference herein in its entirety.

TECHNICAL FIELD

The invention generally relates to a blade for a wind turbine, and to a blade for a wind turbine comprising a lightning measurement system.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbines may be arranged together to form a wind park or wind power plant.

Lightning strikes are a major cause of concern for wind turbine sustainability. With wind turbines being located in remote areas for the best wind catchment, the turbines are a particularly attractive target for lightning strikes due to their height and material composition.

Wind turbine blades typically encompass advanced lightning protection systems, some of which comprise features such as lightning receptors and a lightning down conductor for conducting lightning to ground to prevent lightning strikes from damaging the wind turbine blade. It is desirable to understand the effects of a lightning strike on a wind turbine.

SUMMARY

One embodiment of the invention provides a wind turbine blade, comprising a proximal end, where the blade is attached to a rotor hub at a blade root portion; and a distal end, where the blade tapers to form a blade tip, a lightning protection system, comprising at least one lightning receptor exposed on a surface of the blade for receiving a lightning strike, and a lightning down conductor coupled to the lightning receptor for relaying lightning current from a lightning strike, the down conductor running internally within the blade and coupled to an electrical ground; and a lightning current measurement system, for deriving parameters of a lightning strike, comprising a lightning current sensor comprising a coil of metal substantially circumscribing the down conductor, the coil in proximity with the down conductor so as to detect magnetic field fluctuations, a lightning analytical system coupled to the lightning current sensor, for receiving an output reading from the lightning current sensor and to provide lightning current parameters, and a signal conversion unit coupled between the lightning current sensor and the lightning analytical system; wherein the signal conversion unit is physically located in the blade and is separated from the blade root by a spacing distance so as to reduce the occurrence of a flashover.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention provides a wind turbine blade, comprising a proximal end, where the blade is attached to a rotor hub at a blade root portion; and a distal end, where the blade tapers to form a blade tip, a lightning protection system, comprising at least one lightning receptor exposed on a surface of the blade for receiving a lightning strike, and a lightning down conductor coupled to the lightning receptor for relaying lightning current from a lightning strike, the down conductor running internally within the blade and coupled to an electrical ground; and a lightning current measurement system, for deriving parameters of a lightning strike, comprising a lightning current sensor comprising a coil of metal substantially circumscribing the down conductor, the coil in proximity with the down conductor so as to detect magnetic field fluctuations, a lightning analytical system, for receiving an output reading from the lightning current sensor and to provide lightning current parameters, and a signal conversion unit coupled between the lightning current sensor and the lightning analytical system; wherein the signal conversion unit is physically located in the blade and is separated from the blade root by a spacing distance so as to reduce the occurrence of a flashover.

As wind turbine blades are prime locations for lightning strike attachments, the provision of such a system within the wind turbine blade allows the investigation of a lightning strike event at or close to the point of entry of lightning current into the wind turbine. This is especially useful in understanding how much lightning current the lightning protection system of the blade has to carry, as well as identifying which blade has been hit by lightning. Furthermore, the provision of the magnetic field lightning current sensor in proximity with the down conductor allows for an accurate measurement of the lightning current travelling within the down conductor and reduces any effect of loss due to attenuation.

By providing the signal conversion unit physically within the blade and separating from the blade root by a spacing distance provides electrical insulation between the signal conversion unit and metallic installations in the blade root. Electrical isolation of the signal conversion unit is provided as the lightning current sensor is electrically disconnected from the down conductor system. This allows for a portion of the lightning current measurement system, which is physically located in the blade, to be relatively protected from a direct lightning current transfer through conduction, or from a flashover.

In an embodiment, the entire lightning measurement system is physically located in the blade and is separated from the blade root by the same spacing distance so as to reduce the occurrence of a flashover.

In an embodiment, the output of the lightning measurement system is provided to a central controller in the nacelle of the wind turbine through fiber optic cabling.

In an embodiment, the lightning down conductor is coupled to a blade band external to the blade at a blade root portion, and the lightning current sensor is mounted on an internal surface of the blade, and circumscribing the lightning down conductor.

In another embodiment, the blade band is secured to the blade at a predetermined distance from the blade root, and the spacing distance is at least equivalent to the predetermined distance.

In an embodiment, the sensor is a large frequency bandwidth current sensor.

In another embodiment, the frequency bandwidth of the current sensor is from 0 to 10 MHz.

In an embodiment, the frequency bandwidth of the current sensor is from 0 to 10 MHz.

In another embodiment, the sensor measures a current range from ±100 A to ±10 kA.

In yet another embodiment, the sensor measures a current range from ±20 A to ±400 kA.

In an embodiment, the lightning current measurement system comprises two lightning current sensors.

In another embodiment, one lightning current sensor measures a current range from ±20 A to ±20 kA and the other lightning current sensor measures a current range from ±400 A to ±400 kA.

In an embodiment, the two lightning current sensors are identical.

In an embodiment, the lightning current sensor is a Rogowski-coil based current sensor.

In an embodiment, the lightning current sensor is provided with a sensor protection system for preventing dielectric breakdown.

In another embodiment, the sensor protection system comprises providing insulation about the coil of metal, the insulation having a dielectric breakdown voltage of at least 20 kV.

A wind turbine is further provided, comprising a wind turbine blade as described above.

Another aspect of the invention provides a method of measuring a lightning strike on a wind turbine, comprising: receiving a lightning strike on a lightning receptor on a wind turbine, directing the lightning strike onto a lightning down conductor coupled to electrical ground, obtaining, with a lightning current sensor, a measurement of magnetic field fluctuations due to the passage of electrical current from the lightning strike through the down conductor, determining an electrical current signal of the lightning strike from the magnetic field fluctuation measurement with a signal conversion unit, conditioning the electrical current signal for analysis with a current conditioning module, and extracting, from the conditioned electrical current signal, a parameter of the lightning strike which corresponds to a physical effect of the lightning strike on the wind turbine.

In an embodiment, a DC offset is reduced in the electrical current signal during the conditioning, with a DC offset module in the current conditioning module.

In another embodiment, the conditioning of the electrical current signal comprises identifying a lightning strike time period corresponding to the start and the end at which the lightning strike passes through the down conductor, and extracting the electrical current signal during the lightning strike time period.

In an embodiment, the method further comprises predetermining a noise floor of the electrical current signal prior to a lightning strike, determining the level at which the electrical current signal exceeds the predetermined noise floor as the start of the lightning strike, determining the level at which the electrical current signal drops below the predetermined noise floor as the end of the lightning strike.

In an embodiment, the electrical current signal is smoothened to provide a more accurate identification of the lightning strike time period.

In another embodiment, the electrical current signal is magnified to provide a more accurate identification of the lightning strike time period.

In an embodiment, at least one of the following lightning strike parameters are extracted from the conditioned electrical current signal: a peak current, a maximum current rise time, a specific energy of the lightning strike and a total charge of the lightning strike.

In another embodiment, all four of the lightning strike parameters are extracted from the conditioned electrical current signal.

In an embodiment, the method further comprises passing the conditioned electrical current signal through a low pass filter, prior to extracting any one of the specific energy and the total charge.

In an embodiment, the low pass filter has a cut-off frequency of about 250 kHz.

In an embodiment, the method further comprises converting the conditioned electrical current signal to positive values prior to extraction of the lightning strike parameters.

In an embodiment, an α-stroke peak current and a β-stroke peak current are identified from the peak current.

In an embodiment, the α-stroke peak current is identified as a current peak originating from a DC value, while the β-stroke peak current is identified as a current peak originating from zero.

In an embodiment, the method further comprises identifying a period of current measurement comprising the electrical current signal of the lightning strike for total charge measurement, establishing a noise floor in a noise floor check period during the period of current measurement, projecting a total noise floor in the period of current measurement, and estimating the total charge of the lightning strike by integrating over the period of current measurement and subtracting the total noise floor therefrom.

In an embodiment, there is provided an apparatus for measuring a lightning strike on a wind turbine, the apparatus configured to: obtain, with a lightning current sensor, a measurement of magnetic field fluctuations due to the passage of electrical current from a lightning strike on a wind turbine passed through a down conductor, determine an electrical current signal of the lightning strike from the magnetic field fluctuation measurement with a signal conversion unit, condition the electrical current signal for analysis with a current conditioning module, and extract, from the conditioned electrical current signal, a parameter of the lightning strike which corresponds to a physical effect of the lightning strike on the wind turbine.

In another embodiment, there is provided a computer readable medium having a computer program recorded thereon, the computer program comprising instructions which, when executed by a processor, causes the processor to perform a method of measuring a lightning strike on a wind turbine, comprising the steps of: receiving a lightning strike on a lightning receptor on a wind turbine, directing the lightning strike onto a lightning down conductor coupled to electrical ground, obtaining, with a lightning current sensor, a measurement of magnetic field fluctuations due to the passage of electrical current from the lightning strike through the down conductor, determining an electrical current signal of the lightning strike from the magnetic field fluctuation measurement with a signal conversion unit, conditioning the electrical current signal for analysis with a current conditioning module, and extracting, from the conditioned electrical current signal, a parameter of the lightning strike which corresponds to a physical effect of the lightning strike on the wind turbine.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
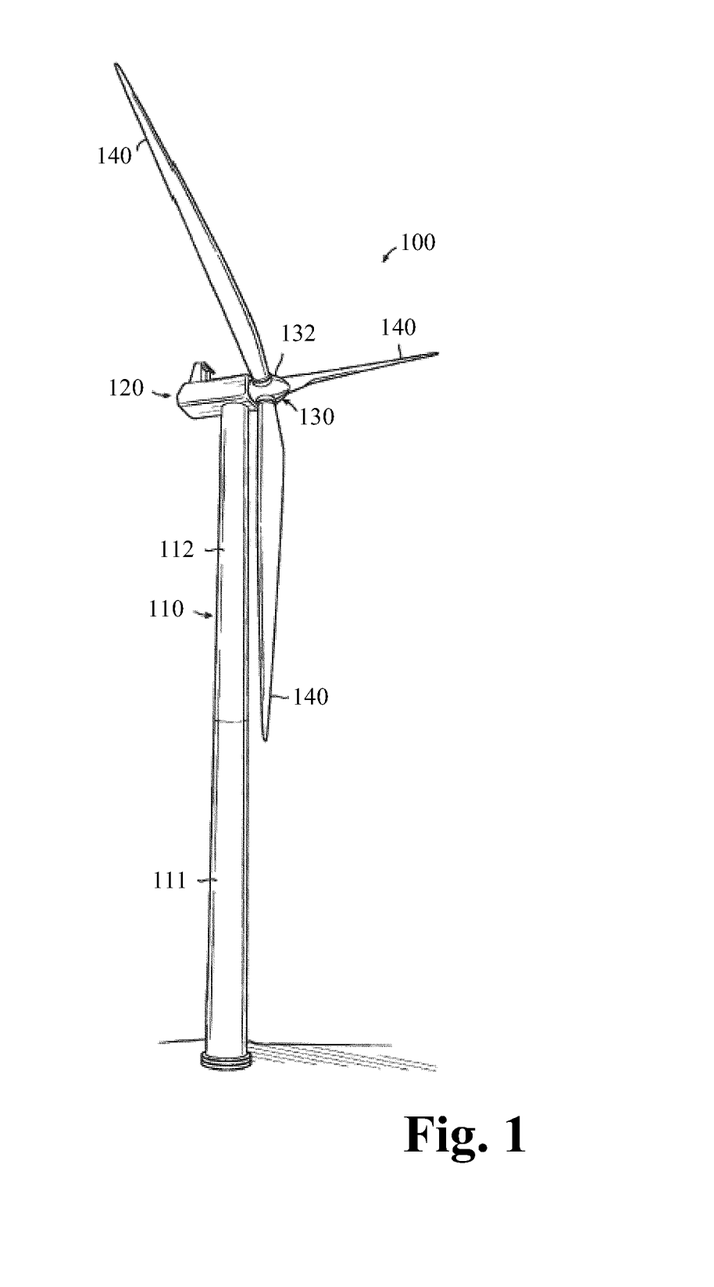
FIG. 1 illustrates a wind turbine.

FIG. 1 illustrates an exemplary wind turbine 100 according to an embodiment. As illustrated in FIG. 1, the wind turbine 100 includes a tower 110, a nacelle 120, and a rotor 130. In one embodiment of the invention, the wind turbine 100 may be an onshore wind turbine. However, embodiments of the invention are not limited only to onshore wind turbines. In alternative embodiments, the wind turbine 100 may be an offshore wind turbine located over a water body such as, for example, a lake, an ocean, or the like. The tower 110 of such an offshore wind turbine is installed on either the sea floor or on platforms stabilized on or above the sea level.

The tower 110 of wind turbine 100 may be configured to raise the nacelle 120 and the rotor 130 to a height where strong, less turbulent, and generally unobstructed flow of air may be received by the rotor 130. The height of the tower 110 may be any reasonable height, and should consider the length of wind turbine blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 132 and at least one blade 140 (three such blades 140 are shown in FIG. 1). The rotor hub 132 may be configured to couple the at least one blade 140 to a shaft (not shown). In one embodiment, the blades 140 may have an aerodynamic profile such that, at predefined wind speeds, the blades 140 experience lift, thereby causing the blades to radially rotate around the hub. The hub 140 further comprises mechanisms (not shown) for adjusting the pitch of the blade 140 to increase or reduce the amount of wind energy captured by the blade 140. Pitching adjusts the angle at which the wind strikes the blade 140.

The hub 132 typically rotates about a substantially horizontal axis along a drive shaft (not shown) extending from the hub 132 to the nacelle 120. The drive shaft is usually coupled to one or more components in the nacelle 120, which are configured to convert and the rotational energy of the shaft into electrical energy.

Typically, the blade 140 may vary from a length of 20 meters to 60 meters, and beyond. Such blades are precisely manufactured to ensure that the rotor remains balanced for optimum aerodynamic performance. The lightning protection system for use in the wind turbine blade is integrated into the manufacturing process, the end product being that the manufactured blade comprises a fully operable lightning protection system. Blade 140 is formed by a manufacturing process which includes pre-impregnation of composite fibers ("pre-preg"), which is well-known and will not be elaborated on. Other manufacturing methods may be used as well.

Figure 2:
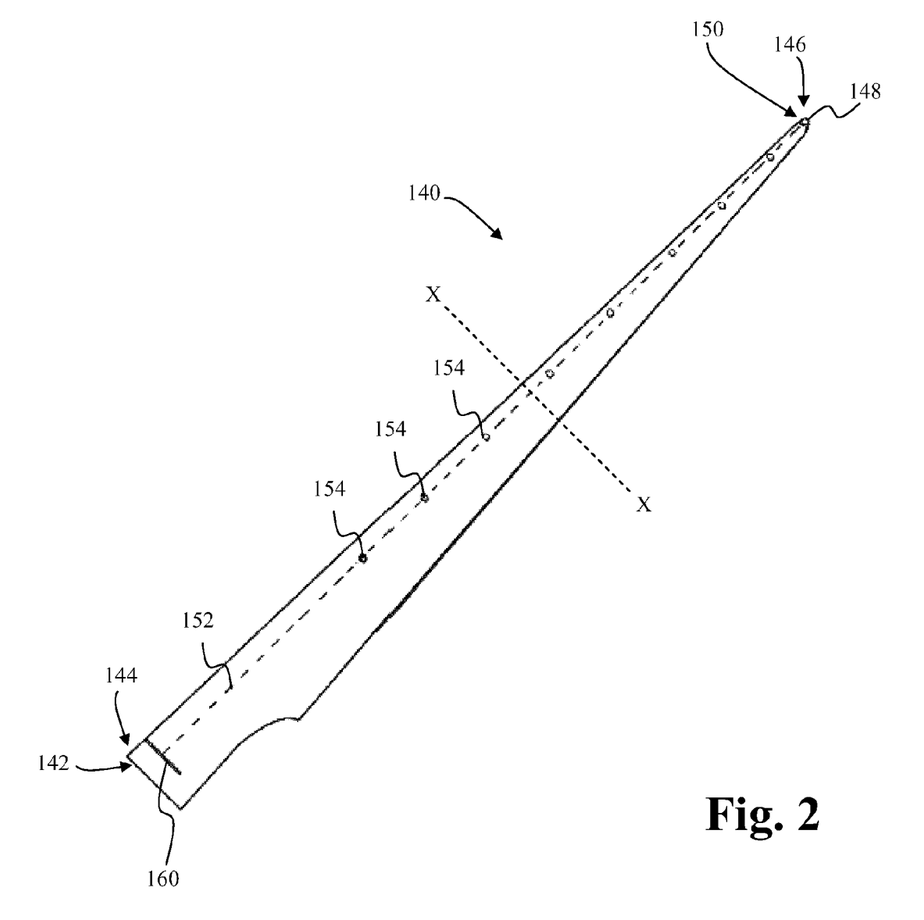
FIG. 2 illustrates a wind turbine blade according to an embodiment.

FIG. 2 illustrates as wind turbine blade 140 according to an embodiment. Blade 140 is a 50 m blade, but may be of any other length in other embodiments. A blade root portion 144 comprises a proximal end or blade root 142 of the blade 140. The blade root portion 144 is typically a cylindrical section of the blade 140 which may taper to form a central spar 156 (see FIG. 3) which acts as an internal support for the blade 140. In such a case, two opposing blade shells, one forming a leeward surface of the blade, the other forming a windward surface of the blade, are thereafter joined together over the central spar to form the blade 140. A blade band 160 is provided at the blade root portion 144.

Blade 140 tapers towards the end the blade 140 at a distal end to form a blade tip 146. Blade tip 146 comprises a tip receptor 148 which takes the shape and form of a typical blade tip and forms a part of the blade lightning protection system 150. Tip receptor 148, being a good electrical conductor, provides for the easy formation and release of electrical leaders and is thus extremely attractive for lightning stroke formation and attraction. In order to provide an effective and durable segment to be incorporated into the blade 140, and which is able to receive and resist multiple lightning strikes, the tip receptor 148 is composed entirely of metal, and in the present embodiment, of copper.

The tip receptor 148 is coupled onto the blade 140 by a nut and bolt securing configuration, but any other means which allows the blade to be securely fasted on the blade may be possible. The tip receptor 148 is also directly fastened, by crimping, to a down conductor (indicated as broken line 152) on the inside of the blade 140. Other methods are possible.

Lightning protection system 150 also comprises a plurality of side lightning receptors 154 along the length of the blade 140. The side lightning receptors 154 are provided along a central line of the blade 140, and are located above the blade spar 156. The side receptors 154 are exposed on both the leeward and windward surfaces of the blade and are coupled to the down conductor 152 inside the blade. Down conductor 152 comprises a core of copper wire, in the present embodiment around 50 mm$^2$ in cross-section. High voltage insulation is then provided about the copper core of down conductor 152. In this embodiment, silicone rubber is provided, but any other electrical non-conductor or polymer-type insulation with a high dielectric breakdown voltage may also be used.

In the present embodiment, eight side receptors 154 are provided along the length of the blade, the average spacing between each receptor being about 4 m. In other embodiments, other arrangements of lightning receptors are possible, e.g. the lightning receptors are only provided for only a leeward or a windward surface, the lightning receptors are provided closer to the trailing edge, etc.

Figure 3:
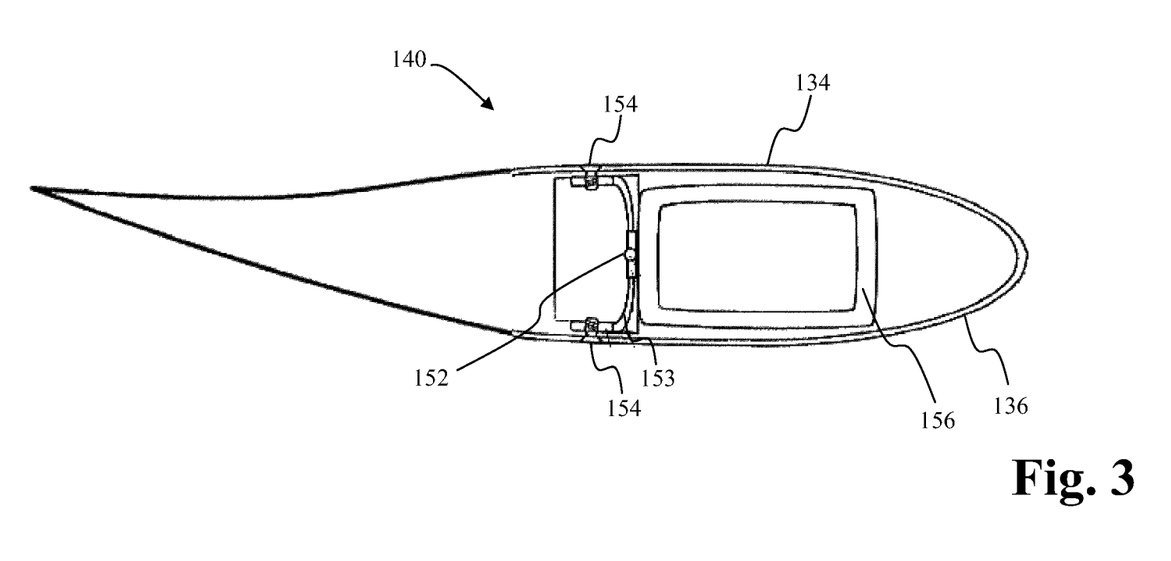
FIG. 3 illustrates a cross-sectional profile of the blade of FIG. 2.

FIG. 3 illustrates a cross-sectional profile of the blade 140 at X-X in FIG. 2. Two side receptors 154 are shown as provided for the lightning protection system 150, one on the lee-ward side 134 of the blade and another on the wind-ward side 136. The side receptors 154 are located adjacent, and not contacting, spar 156. The side receptors 154 are installed by means of screw formations through the shell of the blade 140 and are secured to a receptor base 158 on the interior of the blade 140. The receptor base 158 is thereafter connected to the down conductor 152 running along the blade spar 156 with a braid of copper wires 153. There may also be a block of low-density polyethylene foam holding the receptor base 158 in place. Any other lightning protection system arrangement may also be possible.

The down conductor 152 is a relatively thick bundle of copper wires running along the length of the blade spar 156 for the purpose of high voltage lightning strike current transmission. As indicated above, the down conductor 152 is connected to the side receptor 154 by a copper wire braid 153. The connection from the down conductor 152 to the copper wire braid 153 is formed with a high quality weld or a pressed connection. The copper wire braid 153 may or may not comprise additional insulation, depending primarily on the distance from the blade tip.

The spar 156 is shown internal to blade 140 and acts as a support to the blade 140 and is substantially rectangular in shape. The spar 156 is composed of primarily of carbon fiber and epoxy for light-weight but resilient construction. The down conductor 152 is coupled to a tip receptor 148, as mentioned, at one end and to a blade band 160 external to the blade 140 at the blade root portion 144, at the other end. The blade band 160 thereafter provides a sliding surface for electrical contact with a lightning current transfer unit (not shown) between the blade band 160 and the nacelle 120 of the wind turbine 100. A conventional lightning current transfer unit is described in U.S. Pat. No. 7,654,790, in which the proprietor is the present applicant. The lightning current transfer unit allows the electrical transmission of current from the blade 140 to the nacelle 120, bypassing the hub 132, and thereafter conducting the lightning current to electrical ground. In this way, lightning current is electrically isolated from the rotor hub 132 and rotor bearings supporting the rotor shaft.

Figure 4:
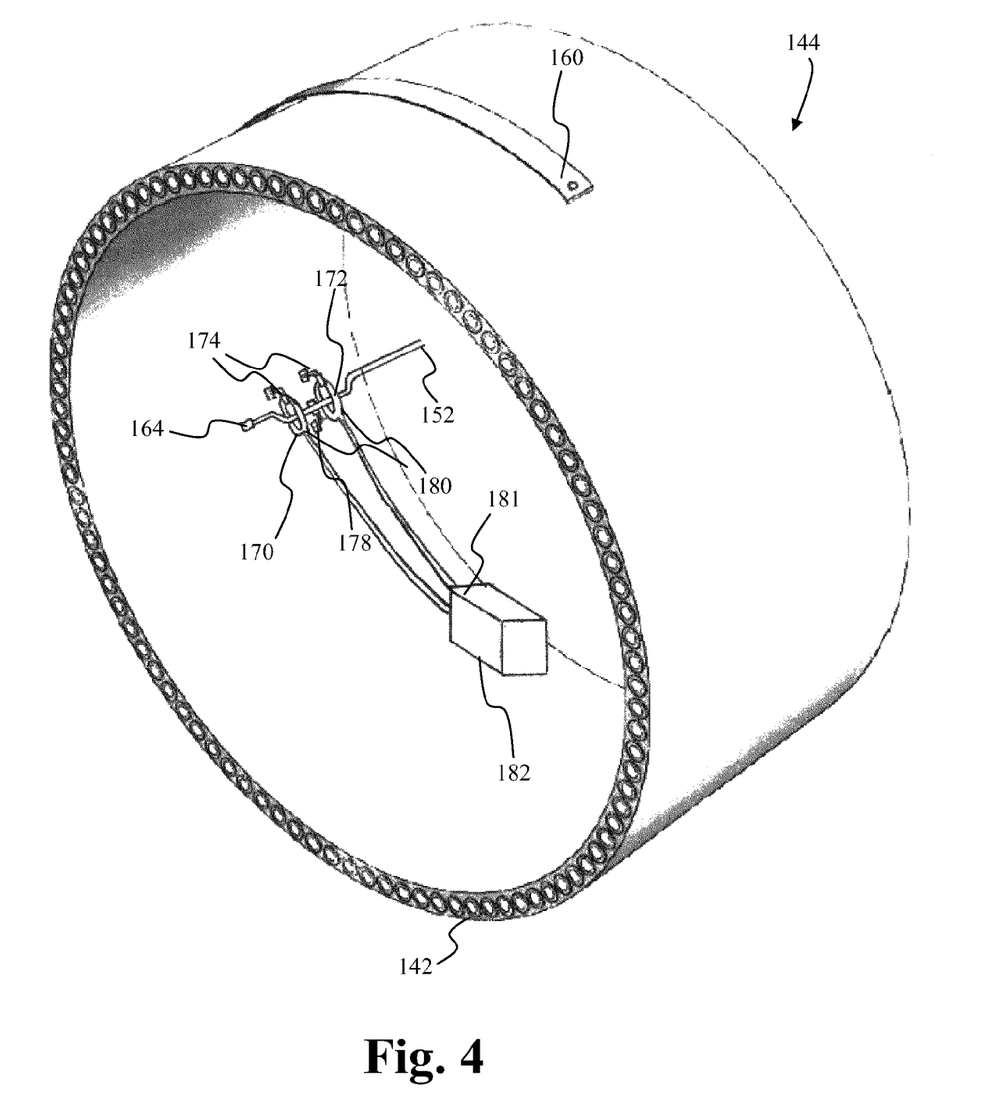
FIG. 4 illustrates a section of a blade root portion of the blade of FIG. 2.

FIG. 4 illustrates a section of the blade root portion according to the present embodiment. Blade band 160 is shown as coupled to a portion of the external circumference of the blade 140. As indicated above, blade band 160 provides a sliding surface for electrical contact with a lightning current transfer unit, more specifically, the lightning current transfer unit comprises at least two sliding contacts, one for contacting the blade band 160, and the other for contacting a separate band (not shown) on the nacelle 120. As such, the blade band 160 should be of a length sufficient to ensure consistent contact between the lightning current transfer unit sliding contact and the blade band regardless of the pitch angle of the blade. In the present embodiment, the blade band 160 covers about 120° of the blade root portion 144. Blade band 160 is secured onto the blade root portion 144 by means of nut and bolt fastening, but other methods may be possible.

Down conductor 152 is shown as extending proximally down to the blade root portion 144 and terminating into the wall of the blade 140. As mentioned above, the blade root portion 144 may taper off distally to form a central spar 156 of the blade 140. A hole is thus drilled through the spar 156 distal to the blade root portion 144 to allow the down conductor 152 to be transposed from the outside of the spar 156 to the inside. Opposing leeward surface and windward surface blade shells will provide a cover for the down conductor 152 until it is transposed internally into the blade.

Figure 4A:
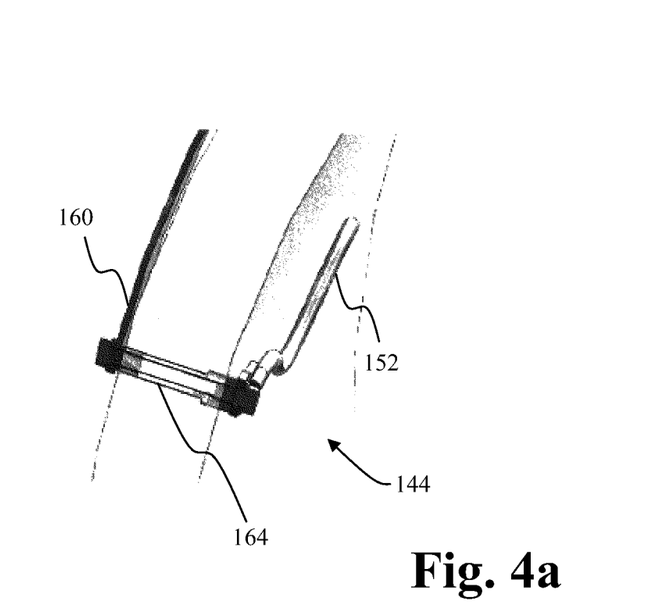
FIG. 4a illustrates a close-up view of a section of the blade root portion of FIG. 4.

The down conductor 152 is coupled to the blade band 160 through the wall of the blade 140 by a bushing 164 at the blade root portion 144. FIG. 4a illustrates a close-up view of a section of the blade root portion according to the present embodiment. A section of down conductor 152 is illustrated, terminating at the blade root end 142 and coupled to bushing 164 by a simple electrical socket connector. Other attachment means are possible.

Bushing 164 facilitates the electrical connection between the down conductor 152 and blade band 160. In order to establish bushing 164, a hole is first drilled in the wall of the blade 140 at the blade root portion 144 and bushing 164 is inserted into the cavity. Blade band 160 is then anchored on one end to the blade 140 by a secure connection to one end of the bushing 164, and to the blade 140 itself by a bolt connection 166 on the other end of the blade band 160. The down conductor 152 is as indicated coupled to the other end of bushing 164 by the electrical socket connector. There can also be other means of connecting the down conductor to the blade band.

Returning to FIG. 4, lightning current sensors 170, 172 are provided, circumscribing down conductor 152. In the present embodiment, lightning current sensors 170, 172 are current sensors based on Rogowski coil current sensing technology. Such sensors utilize Faraday's law and output a low voltage output correlated to the rate of change of magnetic flux due to electrical current flow. Such sensors may also be known as magnetometers. Rogowski coil sensors are chosen as they allow for a wide bandwidth of frequency operation, from 0 Hz (Direct Current) to MHz levels. The current sensors 170, 172 are envisioned as flexible Rogowski coil comprising a metal wire loop. The wire loop may be configured as a single turn, a simple helix, a toroid, or other configuration used to form a sensor.

In the present embodiment, the wire loops of current sensors 170, 172 are shaped into a flexible coil of uniform cross section wound upon a non-ferrous core. The lead from one end of the coil is returned through the center of the coil to the other end, so that both terminals are at the same end of the coil. The voltage measured across the coil will be proportional to the rate of change of the magnetic field. Also present in the current sensors 170, 172 is the coaxial routing of the coil ends back to the beginning. This allows the current sensors 170, 172 to be temporarily separated to allow installation around the down conductor 152.

The current sensors 170, 172 are coupled to the wall of the blade 140 by means of mounting arms 174 which are then attached to wall mount couplings 176. Mounting the current sensors 170, 172 allow the sensors to maintain a relatively stable proximity about the down conductor 152 so as to optimize the conditions to detect magnetic field fluctuations for current measurement. Mount 178 is provided for the down conductor 152 to be spaced apart from the wall of the blade 140 so as to allow for the current sensors 170, 172 to be circumscribed about the down conductor 152.

Further, a sensor protection system 180 is provided for each lightning current sensors 170, 172. The protection system 180 provides a layer of insulation about the sensor coils and has a dielectric breakdown voltage of at least 20 kV. The sensor protection system 180 protects the sensors 170, 172 in the event of a lightning current surge during a lightning strike event on a lightning receptor 148, 154. Particularly, the protection system 180 seeks to address the issue of dielectric breakdown due to the voltage rise caused by the lightning current. Further, as the coils within sensors 170, 172 comprise metal, being good electrical conductors, there may be occurrences of a sparkover between the down conductor 152 and the current sensors 170, 172 during a lightning strike event. Adequate insulation provided by the sensor protection system 180, as well as the improved high voltage insulation on the down conductor 152, seeks to inhibit such an occurrence.

Two current sensors 170, 172 are provided in the present embodiment, each one for a specified maximum current range—one for a range from ±20 A to ±20 kA the other for a range from ±400 A to ±400 kA. It is noted that present technology limits the optimal maximum current range of a Rogowski coil based current sensor to about 60 dB. However, should technology improve to allow a current sensor to operate with a bandwidth of about 80 dB, it may be envisioned that only one lightning current sensor may be provided in the lightning current measurement system, to cover the expected current range of a lightning strike.

The following equation provides the voltage output by the Rogowski coil based current sensors 170, 172:

$$V = \frac{-AN\mu_0}{l}\frac{dI}{dt} \quad (1)$$

where $A=\pi a^2$ is the cross-sectional area of the current sensor coil, N is the number of turns in the sensor coil, and $l=2\pi R$ is the length of the sensor coil.

$\frac{dI}{dt}$ is the rate of change of the current threading the current sensor coil, and is directly proportional to the rate of change of the magnetic field by the vacuum permeability factor (or magnetic constant) of $\mu_0 = 4\pi \times 10^{-7}$. This formula assumes the turns are evenly spaced and that these turns are small relative to the radius of the coil itself. Such an arrangement also provides relative isolation from electromagnetic interference.

As indicated above, the voltage generated that is induced in the coil is proportional to the rate of change of current in the straight conductor. To determine and record the reading as measured by the lightning current sensors 170, 172, the output of the sensors 170, 172 are connected to a signal conversion unit 181, which in the present embodiment is part of a lightning analytical system 182. The lightning analytical system 182 is mounted on the wall of the blade 140 at the blade root portion 144 and is coupled to the wind turbine controller (not shown) in the nacelle 120 by means of fiber optic data cables running through the hub 132 and the drive shaft. In such a case, the lightning analytical system 182 is electrically isolated from the wind turbine controller.

The lightning analytical system is typically a post processing system and comprises at least a data management system, and a processor comprising means to execute instructions on a computer program recorded on a computer-readable medium. As such a system comprises metallic components, it is put at risk from a flashover from lightning stroke current carried in down conductor 152 or blade band 160. Sufficient shielding is also provided for the lightning analytical system from magnetic field effects emanating from lightning current.

The blade band 160 is typically located a certain predetermined distance from the blade root 142. This is so as to provide for sufficient electrical insulation between the lightning down conductor 152 and metal parts at the blade root junction at which the blade 140 is attached to the hub 132, so as to reduce the occurrence of current flashover.

This predetermined distance is provided by the electrical insulation separation distance equation:

$$s = k_i \frac{k_c}{k_m} l \quad (2)$$

where:
s is the calculated separation distance
$k_i$ depends on the class of the lightning protection system—in the case of wind turbines—Class I ($k_i$=0.08)
$k_c$ depends on the lightning current flowing on the down-conductors (based on number of down conductors) ($k_c$=1)
$k_m$ depends on the electrical insulation material—in this case air ($k_m$=1)
l is the length in meters, along the down conductor, from the point where the separation distance is to be considered (the blade band), to the nearest equipotential bonding point (in this case, where the current is to be grounded in the nacelle).

In a typical wind turbine blade, the predetermined separation distance works out to be about 50 cm; i.e. the blade band 160 is coupled to the blade 140 at a distance of 50 cm from the blade root 142.

As to the lightning current measurement system of the present embodiment, the lightning current sensors 170, 172 provide nominal air separation from the down conductor 152. As such, the lightning current measurement system circuit is considered to be electrically isolated from the lightning protection system of the wind turbine blade as well as the wind turbine controller. Consideration of lightning strike current utilizing the lightning measurement circuit as a conductive path in forming an electrical arc over to the blade root 142 is addressed by providing a spacing distance between the lightning analytical system 182 to reduce the occurrence of a flashover. This spacing distance is at least equivalent to the predetermined distance. In other words, the lightning analytical system 182 is mounted to the inside of blade 140 at the blade root portion 144 at least 50 cm, when measured perpendicularly, from the blade root 142.

In another embodiment, the signal conversion unit 181 is an electrical-optical converter, with an output coupled to fiber optic cabling. In this case, the lightning analytical system 182 is no longer located in the blade 140, but in the hub 132 or in the nacelle 120, and is coupled to the electrical-optical converter through the fiber optic cables.

Figure 5:
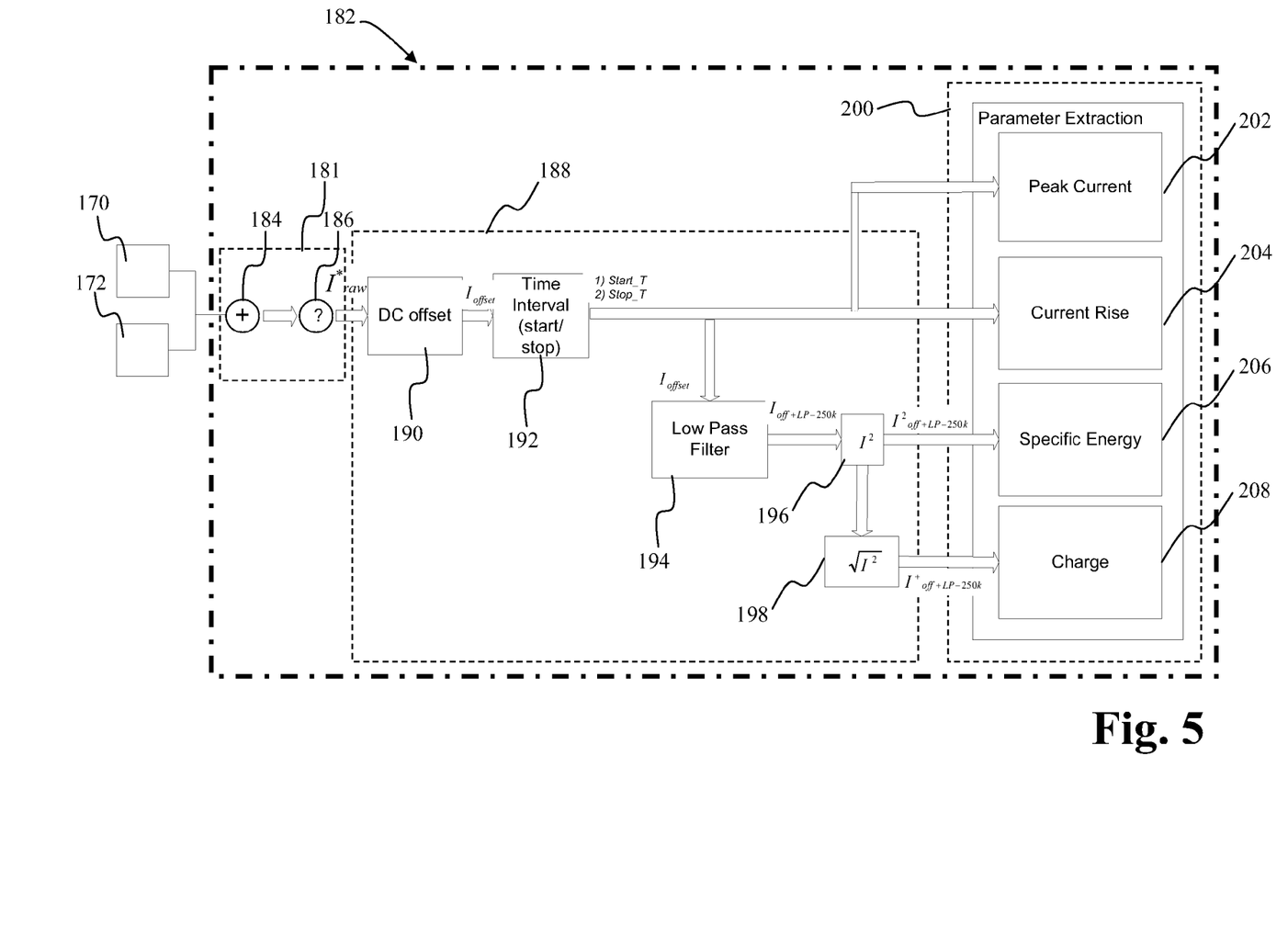
FIG. 5 illustrates a schematic block diagram of a lightning measurement system according to an embodiment.

In the present embodiment, the lightning analytical system 182 comprises signal conversion unit 181 which is designed to determine an electrical current signal of the lightning strike from the magnetic field fluctuation measurement of the lightning current sensors. As shown in FIG. 5, the signal conversion unit 181 comprises a comparator 184 which receives the outputs of the lightning current sensors 170, 172 and provides a single overall measurement signal. Further, the signal conversion unit 181 comprises an electronic integrator unit 186 which receives the overall measurement signal and provides an output that is proportional to and representative of the current flowing through the down conductor 152. The lightning analytical system 182 is further designed to provide four parameters of the lightning stroke measured by lightning current sensors 170, 172, namely peak current, specific energy of the stroke, total charge and current rise time.

The above-named lightning stroke parameters are related to certain physical effects and design considerations of, for example, the lightning protection system of the wind turbine blade, in view of the information derived from the lightning stokes can then be addressed. Furthermore, the lightning stroke parameters can be used to provide an estimation of the effect of or damage caused by the lightning strike on the wind turbine blade. For example, the peak current of the lightning stroke, measured in kAmperes (kA), is directly related to mechanical forces. This in turn deals with design considerations such as the mechanical fixation of cables and connectors, the physical bonding of components, and the considerations of electrical energy in wind turbine components.

As for specific energy of the lightning stroke, measured in MJoules/Ω, the related physical effect is that of thermal heating. This corresponds to design considerations such as current conductor size/cross-section, the heating/melting of materials nearby the current conductor, and other aspects related to mechanical and thermal forces.

Total charge of the lightning stroke, measured in Coulombs, relates to effects such as surface erosion and melting of materials. As such, design considerations such as mechanical factors of blade lightning receptors, other designed lightning strike points and the lightning current transfer unit can be addressed during investigations.

Physical effects such as voltage rise are related to the current rise time of the lightning stroke, or $$\frac{di}{dt}.$$

Such investigations provide information for the analysis of the coupling mechanisms and the shielding.

In an aspect of the invention, there is provided a method of measuring a lightning stroke on a wind turbine blade, comprising at least determining an electrical current signal from a lightning current sensor output, conditioning the electrical current signal for analysis with a current conditioning module and extracting, from the conditioned electrical current signal, a parameter of the lightning strike which corresponds to a physical effect of the lightning strike on the wind turbine blade. Such a method may also provide an efficient way to process large amounts of lightning current effectively.

FIG. 5 illustrates a schematic block diagram of a lightning measurement system according to an embodiment. In FIG. 5, a block diagram of a lightning analytical system 182 is shown coupled to the outputs of lightning current sensors 170, 172. The lightning analytical system 182 comprises, in general, a current conditioning module 188 and a lightning current parameter extraction module 200.

Output $V_{C1}*$ and $V_{C2}*$, from lightning current sensors 170 and 172 respectively are provided to comparator 184, which combines the currents to output a single overall measurement $V_C*$. $V_C*$ is then passed through an integrator unit 186 which generates a raw measured electrical current signal $I_{raw}*$.

The electrical current signal $I_{raw}*$ is thereafter provided to the current conditioning module 188 which conditions the electrical current signal $I_{raw}*$ for analysis. Such a conditioning module allows for the manipulation of the raw current signal $I_{raw}*$ to allow lightning strike parameters to be extracted.

Current conditioning module 188 comprises a DC offset module 190 which receives electrical current signal $I_{raw}*$. The DC offset module 190 functions to remove or reduce the effects of a DC offset on the analysis of the electrical current signal $I_{raw}*$. As a definition, DC offset is an offsetting of signal from zero. DC offset is the mean value of a signal without an event; if the mean value is zero, then there is no dc offset.

A DC offset is problematic as it affects where the zero crossings of the electrical signal appear, which will affect the calculations of the lightning parameters. It is therefore desirable to remove or reduce the dc offset while processing the electrical current signal $I_{raw}*$. This is achieved in the present embodiment by subtracting the mean value calculated from certain initial samples within the electrical current signal $I_{raw}*$. The initial samples are taken in a pre-trigger period prior to the start of the lightning strike event. Trigger is defined as the start of the lightning strike event and triggered event is defined as the time period between the start and end of the lightning strike event.

In the present embodiment, to the triggered event accounts for 80% of data samples to be analyzed, and the pre-trigger period accounts for 20%. The size of the initial samples to be taken for DC offset calculations may be given to be the number of samples in the first 0.5% of the pre-trigger period. For example, if a sampling rate of 10 MHz is used in the lightning analytical system, a total time of 1000 ms is recorded for the pre-trigger and triggered even period, and pre-trigger event is 20% of the total recording time, the number of samples can be calculated as:

No. of samples=10×10⁶×(0.5%×200 ms)=10000 samples

The mean value is then taken from these samples and subtracted from the electrical current signal $I_{raw}*$ to produce $I_{offset}$.

$I_{offset}$ is then passed to a time interval module 192 for the identification of the start and end of the lightning strike event as the calculations of lightning parameters such as total charge, energy and rise time requires time identification of the lightning strike event. An embedded noise floor, such as white noise, usually causes difficulty in the clear definition of the start and end time for the lightning event. White noise is a random signal with a flat power spectral density, i.e., the signal contains equal power within a fixed bandwidth at any centre frequency and the average for the noise amplitude should be zero.

In the present embodiment, the time interval module 192 carries out a method of adjacent averaging to smoothen the current signal. Under adjacent averaging, the average value is obtained from a certain number of data points around each point in the current signal data and the point in the current signal data is replaced with the new average value. The new average value is further squared to magnify the current signal and in order to estimate the noise level. In the embodiment, any value of current signal which is lower than the predefined noise level will be considered as noise. The start time, Start_T, can be identified to be the value exceeding the predetermined noise level and the stop time, Stop_T, can be identified by the time when the current goes below the noise level.

In other embodiments, a separate noise reduction or signal smoothing module may be provided prior to the time interval module 192. In yet other embodiments, other suitable smoothing methods, such as weighted moving average, or Savitz-Golay method, or FFT filter method, or any other applicable methods may be used. In another embodiment, in order to provide even greater noise reduction capabilities, the lightning current sensors 170, 172 are duplicated, i.e. two sets of identical sensors at about the same measurement location. Such noise reduction efforts attempt the cancellation of background noise and provide more accurate measurement results. Further, having two sets of sensors provides an additional advantage in that it will be possible to detect whether the current measured is due to lightning current through the down conductor or if the magnetic fluctuations are picked up due to a nearby lightning strike. The orientation of the magnetic field through the sensors are the same if the magnetic field-causing current is due to current in the down conductor.

Further, a filter 194 may be provided to allow the more accurate determination of certain parameters of the lightning stroke. Filter 194 is a low pass filter that passes low-frequency signals but attenuates signals with frequencies higher than a predetermined cut-off frequency. In particular, filter 194 is a low pass digital filter with a cut-off frequency of 250 kHz.

The output of the filter 194, $I_{off+LP-250}$, is thereafter used for the calculations of the total charge and total specific energy lightning parameters. Such a filter 194 is provided for the calculations of these parameters to allow a focus on the information provided in the current signal at frequencies below about 250 kHz.

In the embodiment, two functional blocks 196 and 198 are provided for the signal $I_{off+LP-250}$ to allow proper conditioning of the current signal in order to derive the respective lightning stroke parameters. Lightning currents consist of both positive and negative strokes, and it is preferable to work with only positive values (i.e., the mathematical integration of positive and negative currents would cause some discrepancies if for example the total charge of the lightning stroke is calculated). The current signal $I_{off+LP-250}$ is first squared as defined by $I^2$ block 196 and then rooted by the $\sqrt{I^2}$ block 198. The results from $\sqrt{I^2}$ block 198 can be used for calculating the total charge and the results from $I^2$ block 196 can be used to calculate the total specific energy.

Lightning current parameter extraction module 200 comprises several sub-modules for the extraction of lightning current parameters based on the measurement of lightning current by the lightning current sensors 170, 172. In the present embodiment, parameter extraction module 200 comprises a peak current module 202, a current rise time module 204, total energy module 206 and charge module 208 are provided. In other embodiments, greater or fewer modules may be provided.

In peak current module 202, a peak current of the lightning stroke, measured in kAmperes (kA), is determined from a conditioned electrical current signal provided by the current conditioning module 188. The conditioned electrical current signal when charted out may also provide indications on the alpha($\beta$)-pulses and beta($\beta$)-pulses in the received lightning stroke.

In lightning analysis, for elevated objects, it is estimated that more than 90% of the flashes to the tower are upward initiated. An upward electrical leader bridges the gap between the grounded elevated object and a cloud and establishes an initial continuing current (ICC) with a duration of some hundreds of milliseconds and an amplitude of some tens to some thousands of amperes. In most cases, current pulses are superimposed on the slowly varying continuing current. These pulses are often referred to as ICC pulses or α-pulses. After the cessations of the ICC, one or more downward leader/upward return stroke sequences may occur—the associated current pulses are called β-pulses. Typically α-pulses are relatively small, less than 10 kA, while β-pulses have current peaks mostly in the range above 5 kA.

Figure 6:
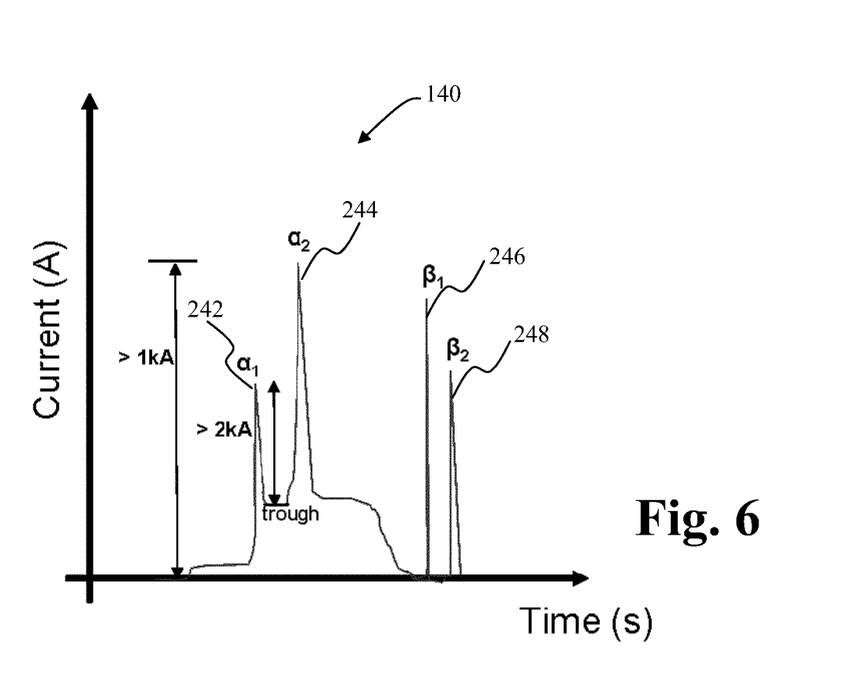
FIG. 6 illustrates an example of a conditioned current signal charted for the determination of peak lightning current.

FIG. 6 illustrates an example of a conditioned current signal charted for the determination of peak lightning current. Essentially, FIG. 6 illustrates on chart 240 the main criterions for defining the threshold for lightning stroke peak currents and classifying the type of lightning strokes. The noise floor of ±200 A, as described above, is taken into account in the defining of the threshold for the lightning stroke peak currents. For the sake of simplicity in processing a large amount of lightning current information, as well as in processing a large number of current peaks, a current peak may be identified by a threshold current rise of greater than 1 kA. The value may be different for other noise floor considerations.

In the case of a current spike 242, which occurs near to another spike 244, a lightning stroke current peak is identified when the current when measured from its trough to the peak is greater than 2 kA. This is to ensure that the current variations do not give current peaks which are not actually present. Spikes 242 and 244 can thus be identified as lightning stroke current peaks. To differentiate between α-pulse currents and β-pulse current peaks, α-pulse current peaks are defined as current peaks resting on a direct current (DC) value, such as spikes 242, 244, while β-pulse current peaks are defined as current peaks residing on the zero line, such as spikes 246, 248. The peak current module 202 thereafter consolidates the identified peak currents and corresponding information and generates them as output.

Current rise time module 204 determines the rise time of the conditioned current signal $I_{offset}$. The rise time of the received lightning stroke will affect the coupling mechanisms in the wind turbine and may induce an electromagnetic field (EMF) which may affect the electronics in the wind turbine if cables and cabinets are not properly shielded. The faster the current rise time, the higher the EMF generated, and as such it is therefore useful to find out the rise time of the lightning flash for design considerations. The current rise may also cause a voltage drop on a wire due to the inductance of the wire. Higher current rises result in higher voltage drops. This voltage drop may also cause flashes to other structural portions of the wind turbine which are not part of the intended lightning dissipation current path to ground.

The rise times of the lightning stroke currents are calculated by differentiating the conditioned lightning current signal throughout the time interval Start_T and Stop_T as identified by time interval module 192. The maximum rise time $$\frac{di}{dt}$$

is then determined.

The total energy module 206 receives the conditioned current $I^2_{off+LP-250k}$ from $I^2$ block 196 and provides the total specific energy of the received lightning stroke. The total specific energy is defined as the integration of the square of the lightning current of the limits set as the lightning stroke start/stop time:

$$\text{Total Specific Energy} = \int_{Stop\_T}^{Start\_T} I^2 dt$$

The charge module 208 receives the conditioned current $I^+_{off+LP-250k}$ from $\sqrt{I^2}$ block 198 and provides the total charge of the received lightning stroke. The total charge of the lightning stroke is defined as the integration of the lightning current over the limits set as the lightning stroke start/stop time:

$$\text{Charge} = \int_{Stop\_T}^{Start\_T} I dt$$

Alternatively, the charge ($C_L$) can be calculated from the simple equation as follows:

$$C_L = C_{All} - C_N$$

where $$C_{All} = \int_{Msmt\_Stop}^{Msmt\_Start} I dt, \text{ and}$$

$$C_N = \left[\int_{Noise\_check\_Stop}^{Noise\_check\_Start} I dt\right] \cdot \frac{t_{measurement\_period}}{t_{Noise\_check\_period}}.$$

To determine the electrical charge of the lightning strike, a period of current measurement, defined by Msmt_Start and Msmt_Stop, and encompassing the lightning strike event, is used in the charge calculation. The measurement period is typically defined to be a period larger than the time period of the lightning event, and includes a noise floor check period, typically taken at the beginning of the measurement period, and prior to any current measurement rise. This noise floor is then assumed constant over the measurement period and subtracted from the charge calculation to provide a reasonable estimate of the electrical charge of the lightning event.

Outputs from the lightning analytical system 182 can thereafter be used as part of damage assessment for the blades and turbine, for input to a remaining life time estimation system or for charting lightning strikes.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A wind turbine blade defining a proximal end and a distal end, the wind turbine blade configured to be attached with a rotor hub at a blade root disposed at the proximal end, the wind turbine blade comprising:
   at least one lightning receptor exposed at a surface of the wind turbine blade and configured to receive a lightning strike;
   a down conductor coupled with the lightning receptor and configured to conduct current from the lightning strike, the down conductor disposed within the wind turbine blade and configured to be coupled with an electrical ground; and
   a current measurement system, comprising:
      a first current sensor and a second current sensor, each comprising a metal coil substantially circumscribing the down conductor and configured to detect magnetic field fluctuations responsive to the conducted current from the lightning strike, wherein the first current sensor is configured to measure currents within a first current range and the second current sensor is configured to measure currents within a second current range wherein the first current range is smaller than the second current range;
      an analytical system configured to determine, based on an output from at least the first current sensor, one or more parameters associated with the lightning strike, and
      a signal conversion unit coupled between at least the first current sensor and the analytical system, wherein the signal conversion unit is disposed within the wind turbine blade with at least a predetermined spacing distance from the blade root to thereby reduce a risk of occurrence of a flashover due to the lightning strike.

2. The wind turbine blade according to claim 1, wherein the current measurement system is disposed within the blade and is separated from the blade root by the predetermined spacing distance, thereby reducing the risk of occurrence of the flashover.

3. The wind turbine blade according to claim 2, wherein the wind turbine blade is included in a wind turbine, wherein an output of the current measurement system is provided to a central controller in a nacelle of the wind turbine through fiber optic cabling.

4. The wind turbine blade according to claim 1, wherein the down conductor is coupled with a blade band disposed on an exterior surface of a blade root portion of the wind turbine blade, the blade root portion extending to the blade root, and wherein the first current sensor is mounted on an internal surface of the wind turbine blade and circumscribes the down conductor.

5. The wind turbine blade according to claim 4, wherein the blade band is secured to the exterior surface at a predetermined second distance from the blade root, and wherein the predetermined spacing distance is equal to or greater than the predetermined second distance.

6. The wind turbine blade according to claim 1, wherein the first current sensor is a large frequency bandwidth current sensor.

7. The wind turbine blade according to claim 6, wherein the frequency bandwidth of the first current sensor is from 0 to 10 megahertz (MHz).

8. The wind turbine blade according to claim 1, wherein the first current sensor is configured to measure currents within a current range from ±20 amps (A) to ±400 kiloamps (kA).

9. The wind turbine blade according to claim 8, wherein the first current sensor is configured to measure currents within a current range from ±100 A to ±10 kA.

10. The wind turbine blade according to claim 1, wherein the first current range is between ±20 amps (A) and ±20 kiloamps (kA), and wherein the second current range is between ±400 A and ±400 kA.

11. The wind turbine blade according to claim 10, wherein the first current sensor and the second current sensor are identical.

12. The wind turbine blade according to claim 1, wherein the first current sensor is a Rogowski coil-based current sensor.

13. The wind turbine blade according to claim 1, wherein the first current sensor further comprises a sensor protection system configured to prevent dielectric breakdown.

14. The wind turbine blade according to claim 13, wherein the sensor protection system comprises an insulation layer disposed around the metal coil and having a dielectric breakdown voltage of at least 20 kilovolts (kV).

15. A wind turbine, comprising a wind turbine blade according to claim 1.

* * * * *